United States Patent [19]

Padula

[11] Patent Number: 4,663,180

[45] Date of Patent: May 5, 1987

[54] PROCESS FOR PRODUCING A STABLE, NON-FROZEN, STRUCTURED POTATO PRODUCT

[76] Inventor: Michael A. Padula, 2708 Cresmont Ave., Easton, Pa. 18042

[21] Appl. No.: 540,286

[22] Filed: Oct. 11, 1983

[51] Int. Cl.$^4$ ............................................. A23L 1/216
[52] U.S. Cl. .................................... 426/637; 426/512
[58] Field of Search ............... 426/575, 637, 512, 438, 426/456

[56] References Cited

U.S. PATENT DOCUMENTS

| | | | |
|---|---|---|---|
| 2,791,508 | 5/1957 | Rivoche | 426/637 X |
| 3,968,265 | 7/1976 | Shatila et al. | 426/637 X |
| 4,192,900 | 3/1980 | Cheng | 426/575 X |

FOREIGN PATENT DOCUMENTS

| | | | |
|---|---|---|---|
| 692961 | 8/1964 | Canada | 426/456 |
| 1280646 | 10/1968 | Fed. Rep. of Germany | 426/438 |
| 296554 | 3/1971 | U.S.S.R. | 426/575 |

*Primary Examiner*—Arthur L. Corbin
*Attorney, Agent, or Firm*—Ruth Moyerman

[57] ABSTRACT

A stable, non-frozen potato product is made from fresh, cooked potatoes with a solids content of from about 10% to about 40% by weight of mix and a high viscosity alginate salt in the range of about 0.1% to about 10% by weight of final product plus additives. The product can be shaped into, for example, french fries or hash browns and will get its shape and stability without prefrying or prefreezing.

5 Claims, No Drawings

PROCESS FOR PRODUCING A STABLE, NON-FROZEN, STRUCTURED POTATO PRODUCT

BACKGROUND OF THE INVENTION

1. Field of the Invention

This invention relates to food or edible material, and more particularly to products and processes by combining diverse food material or permanent additive.

2. Description of the Prior Art

Heretofore, in the production of potato product, it has been necessary at some stage in the process to deal with the propensity for the product to lose both its shape and its stability. This problem has universally been dealt with in the prior art by first shaping the dough into the desired final product such as a french fry. Secondly, the product is fried, at least partially for the purpose of causing the product to hold its shape. Thirdly, the product is then frozen in its partially fried shape to preserve its shape as well as its freshness.

For example, U.S. Pat. No. 3,968,265 to Shatila et al states that "the parfried pieces were then frozen, packaged and shipped to a final destination where they were thawed and finally finish fried in oil . . . "

U.S. Pat. No. 4,167,588 to Willard, in FIG. 1, discloses cutting and shaping at 9, frying at 10, freezing at 12 and shipping and frozen storage at 13.

Heretofore, no process or product thereof was known which wuld permit a potato product to be pre-shaped and retain its shape without prefrying and prefreezing.

SUMMARY OF THE INVENTION

The aforementioned prior art problems are overcome by the process for making a fresh, structured, potato product of this invention in which a critical relationship between potato solids and alginate content has been discovered. In the process of this invention, fresh potatoes are first peeled, de-eyed and trimmed and then cooked, either whole, diced, sliced or even in small pieces, as is conventional. The potato solids are adjusted, if necessary, to between 10% and 40% by weight of mix. Powdered potato may be used to adjust the solids ratio. The potato mix is then mixed with a particular preselected sodium alginate additive in an amount from about 0.1% to about 2.0% by weight of potato mix, together with salt and known prior art additives such as calcium sulphate dihydrate, tetrasodium pyrophosphate and sodium benzoate.

The term algin is used to describe alginic acid and its various inorganic salt forms, which are derived from brown seaweeds (Phaeophyceae). The monovalent salts, often referred to as alginates, are hydrophilie colloids and these, especially sodium alginate, are widely used in the food industry. Alginic acid is composed primarily of mannuronic acid (M) and guluronic acid (G) polymers.

Although using alginates in the preparation of potato products is known, I have discovered that use of a critical range of potato solids to a preselected high G or high M and viscosity alginate will produce a stable fresh potato product. The ratio of potato solids to alginate is critical within a range of both materials. A solids content above about 40% of potato mix results in a shaped product which is not satisfactory even at low alginate content because the product is too dry and brittle, and too easily breaks, resulting in an ability of the end product to keep its shape. On the other hand, a solids content below about 10% of potato mix results in a pudding-like product. The use of increased alignates at below about 10% solids is not beneficial, but instead results in a jellied product that breaks easily and has no consumer appeal.

Within the 10% to 40% solids range of potato mix, and about 0.1% to about 2.0% of product mix of a generally high gel, high viscosity alginate (that is, an alginate with a viscosity of about 150 or more cps), shaped products may be made all the way from mashed potatoes to loaves, french fries, etc., and each product will retain its shape without the need for prefrying or prefreezing.

It is, therefore an object of this invention to produce a potato product that is both fresh and structured without the need for prefrying and prefreezing.

These and other objects will be more readily ascertainable to one skilled in the art from a consideration of the following description and exemplary embodiments.

DETAILED DESCRIPTION OF THE PREFERRED EMBODIMENT(S)

Potatoes are first peeled, with steam, with lye, or an abrasive as is well known in the art. The potatoes are then de-eyed and trimmed to give clean potato. Next, the potatoes are cooked, and they may be cooked whole, diced, sliced or even as small pieces. Diced potatoes are preferred because they cook faster and more evenly. The potatoes may be cooked in a pressure cooker, or cooked, with live steam or hot water, and they may be cooked in batches or in continuous lines as is conventional.

I have discovered that, within a range of values, a critical relationship exists between potato solids and certain alginates which produces a fresh structured potato product that is not either overgelled, so as to be both too brittle to handle and unacceptable to consumers, and undergelled as is the problem with prior art products which necessitates the prefrying and prefreezing. In my invention, it is necessary to ascertain first the percentage of solids in the potatoes and the percentage of water in the potatoes. This percentage may be ascertained by the use of a hydrometer, and a hydrometer which is made specifically for the potato industry is preferred for this measurement.

From this knowledge of the solids content, the solids are then adjusted to from about 10% to about 40% by weight of potato/water mix by potato powder and to this mix is added a preselected alginate with good gel characteristics and generally a high viscosity, preferably as an alginate salt, in amounts from about 0.1% to about 2% by weight of product mix.

Table I below lists the preferred ingredient range for a potato product that may be an extruded or molded product.

TABLE I

| Ingredients | Percentage |
| --- | --- |
| Fresh mixed potatoes (prepared as described above, with 24%–25% solids by weight of mix) | 98.1% |
| Sodium alginate (preferably MANUGEL DJX made by Kelco Co.) - viscosity (1% solution) 160–240 cps | 0.7% |
| Salt | 0.6% |
| Calcium sulfate dihydrate | 0.45% |
| Tetrasodium pyrophosphate | 0.05% |
| Sodium benzoate | 0.1% |

TABLE I-continued

| Ingredients | Percentage |
| --- | --- |
| | 100.00% |

Table I ingredients are mixed and, thereafter shaped. Shapes may be elongated for french fries, various shapes for home fries or hash browns, or they may be sliced, shredded or made into small ball potatoes.

The process of mixing the potato product is best accomplished by putting the hot fresh potatoes (after solids adjustment) in a mixer, and as they are being mixed, to disperse the premeasured other ingredients as dry ingredients over the potatoes. A one hundred pound product can be made in less than a minute by this procedure. While hot potato mixes are preferred because they mash better and the overall process time is shortened, it is possible to utilize a cold potato mix.

In a specific example, 98 pounds of potato was prepared as above. By use of the hydrometer, it was ascertained that the potato solids were only 18%. Forty-nine ounces of potato powder was added (7 oz. of each percent below the desired 25%). To the hot mix, now about 25% solids, is added 13 oz. sodium alginate (MANUGEL DJX), 10 oz. salt, 7 oz. calcium sulfate dihydrate, 1 oz. tetrasodium pyrophosphate and 1 oz. sodium benzoate.

From the mixer, the product mixture is transferred into a final masher and from there into an extruder. It is preferable to work as rapidly as possible because the mixture will begin to set within a two to three minute period.

POTATO LEAF

A potato product loaf may be made by extruding the abovedescribed ingredients in a convenient size, such as about 3" by 3" by 10" long. This loaf may be vacuum packed in plastic bags such as is now done for cheese. The housewife would cut slices from the loaf to be fried as patties, sliced into french fries or heated in the oven or microwave. The loaf could be grated for hash browns. Experimental loafs made this way have been found to have a refrigerated shelf life of up to about thirty days, and the average test user has had no difficulty in using the product.

FRENCH FRIES

To produce french fries from the above-described mix, a cutter may be utilized in combination with an extruder to cut any size length that is desired. The cut, fresh, structured product may be continuously deposited on a belt and blowing air may be utilized to cool and help set the potato product thereby produced.

When cooled and set, the product may be boxed and refrigerated, ready to be sold for the housewife or restaurant to fry and serve as a french fry.

Potato product made by the process of this invention and intended for french fries will be uniform with no signs of any moisture in the potatoes. They may be squeezed or touched and they will be fully dry. The product is firm with very little shrinkage, and the product, when fried, will stay firm for hours even when cold. Experiments indicate that the refrigerated shelf life of the product made as an intended french fry from Table I ingredients has a shelf life of over thirty days.

HOME FRIES

Home fries may be made by utilizing the mixture from Table I prepared in the basic mix as described. As the material is extruded, it may be cut with a fine wire or knife into, for example, slices that are one-quarter in depth. The product may also be molded into a predetermined shape intended by the ultimate user to be cooked as a home fry. Again, experiments indicate that the product made by this method has a shelf life, if refrigerated, of as much as thirty days.

HASH BROWNS

A product product made by the process described above for basic mix may be also utilized to prepare a product intended as a hash brown. A hash brown is generally considered a variation in size and shape to a home fry, and the method previously described for home fries is applicable to the preparation of a hash brown end product also.

Table II below lists preferred ingredient range for preformed mashed potatoes, which may be packaged and sold in pails or tubs, or as croquettes which may be formed into mounds and packaged.

TABLE II

| Ingredients | Percentage |
| --- | --- |
| Fresh mashed potatoes (prepared as described above with about 13% to 14% potato solids by weight of mix for mashed potatoes or about 20% to 30% potato solids by weight of mix for croquettes) | 98.8% |
| Sodium alginate (preferably MANUCOL DMF made by Kelco Co.) - viscosity (1% solution) 250-400 cps | .20% |
| Salt | .60% |
| Calcium sulfate dihydrate | .20% |
| Tetrasodium pyrophosphate | .10% |
| Sodium benzoate | .10% |
| | 100.00% |

The ingredients are mixed as discussed previously for the Table I product. The mashed potato product, after mixing, is finished and ready to use. It may be made by a continuous or batch method and packaged in pails or tubs. This is an especially convenient potato product for restaurants, hospitals and other institutions as well as the housewife. The croquette product is equally convenient to make, store and use.

In the process of this invention, it is necessary to understand that the term algin is used to describe alginic acid and its various inorganic salt forms, which are derived from brown seaweeds (phaeophyceae). The monovalent salts, often referred to as alginates, are hydrophilic colloids and these, especially sodium alginate, are widely used in the food industry.

In this invention, two specific alginates have proven to give the desired structured fresh potato. The first is known as MANGUEL DJX and is available from Kelco/AIL International. This alginate is characterized as high G (meaning a preponderance by percent of gulunoric over mannuronic in the mix) extra fine mesh, high gel with the following parameters:
Viscosity (1% solution)—160–240 cps
pH (1% solution)—5.5–7.5
Dry matter—89–95%
Particle size
 at least 98% through 106 microns
 at least 90% through 75 microns
Powder colour—48 minimum Lead (Pb)—10 ppm maximum
Arsenic (As)—3 ppm maximum
Copper (Cu)—25 ppm maximum
Zinc (Zn)—25 ppm maximum
Microbiological Limits
  (a) Total count—10,000 colonies/g maximum
  (b) Coliform—negative by test
  (c) Salmonella—negative by test The above-described alginate, as sodium alginate, was utilized in the Table I experiments.

The second alginate, also a Kelco/AIL International product called MANUCOL DMF, was used in the mashed and croquette product of Table II. It is characterized as a high M (meaning a preponderance of percent of mannuronic over guluronic in the mix) low calcium, fine mesh, high viscosity alginate with the following parameters:

Viscosity (1% solution)—200-400 cps
pH (1% solution)—4.8-7.5
Dry matter —87-94%
Particle size
  at least 98% through 250 microns
  at least 95% through 150 microns
Powder colour—50 minimum
Lead (Pb)—10 ppm maximum
Arsenic (As)—3 ppm maximum
Copper (Cu)—25 ppm maximum
Zinc (Zn)—25 ppm maximum
Microbiological Limits
  (a) Total count—10,000 colonies/g maximum
  (b) Coliform—negative by test
  (c) Salmonella—negative by test Since alginates are natural derivatives, it is necessary to use some care in their selection, as all alginates will not work in this invention because the manner in which the alginates are themselves processed from their natural state to the finished powder form in which they are used may vary with manufacturer and raw material. Therefore, to pinpoint in advance a suitable alginate, it is necessary to utilize the above parameters, particularly the viscosity and ratio of mannuronic to guluronic content, as a guide if the above-named manufacturer's product is not utilized. It is, however, well within the skill of the art to so ascertain, knowing the solids range and alginate characteristics as set forth above.

This invention also utilizes calcium sulfate. The use of calcium salts with alginates is known. However, it is noteworthy that, in this invention, generally lower percent amounts of calcium sulfate are utilized than is recommended by the alginate distributors. A calcium sulfate dihydrate percent of 0.6 is usual whereas, in this invention, I utilize from about 0.2% for Table II product to 0.45% for Table I product.

There are many variations which may be practiced within the scope of this invention, particularly relating to the mixing steps. Batch or continuous methods may be used and, while it is preferable to dispense the additives as dry powder over the hot potato, this is only optional and other means of combining ingredients is acceptable.

What is important is to recognize that, within a range of potato solids and alginate, a potato product can be fabricated which does not require prefrying and prefreezing and that by following the parameters disclosed herein, a fresh, structured, stable potato product may be formed.

Having now described my invention, it is not intended that such description limit this invention, but rather that this invention be limited only by a reasonable interpretation of the appended claims.

What is claimed is:

1. A process for preparing a nonfrozen, structured potato product comprising the steps of:
   (a) providing a peeled, water-based cooked potato starting material;
   (b) determining proximately after cooking the weight percent potato solids in said material;
   (c) adjusting, if necessary, the percent of potato solids to from between 10% and 40% by weight of said material;
   (d) adding, with blending, an alginate in the range of 0.1 percent to about 2.0 percent by weight of final product mix, said alignate having a viscosity in the range of 160 to 240 cps for a 1.0 percent solution and wherein the alginate has a preponderance by percent of guluronic over mannuronic content;
   (a) adding, with blending, at least one member selected from the group consisting of sodium chloride, calcium sulfate dihydrate, tetrasodium pyrophosphate and sodium benzoate to create a potato product;
   (f) forming said potato product into a definitive, structured shape; and,
   (g) packaging said structured shape for refrigerated, nonfrozen storage,
   whereby said product may be finish cooked directly after removing it from said refrigerated package, and said product, prior to said finish cooking, is stable and remains structured in its nonfrozen and unfinished state.

2. The process according to claim 1 wherein the potato solids percent of step (c) is about 24 percent to about 25 percent.

3. The process according to claim 1 wherein said alginate percent of step (d) is about 0.7 percent.

4. The process according to claim 1 wherein steps (b)–(e) are performed before said cooked product in step (a) has cooled to ambient temperatures.

5. The process according to claim 1 wherein steps (d) and (e) are performed concurrently.

* * * * *

UNITED STATES PATENT AND TRADEMARK OFFICE
CERTIFICATE OF CORRECTION

PATENT NO. : U.S. 4,663,180
DATED : May 5, 1987
INVENTOR(S) : Michael A. Padula

It is certified that error appears in the above-identified patent and that said Letters Patent are hereby corrected as shown below:

Column 1, line 30 following the word "which", delete the word "wuld" and substitute therefor -- would --.

Column 1, line 68, following the word "an", delete the word "ability" and substitute therefor -- inability --.

Column 3, line 35, following the word "POTATO", delete the word "LEAF" and substitute therefor -- LOAF --.

Column 3, line 37, delete the word "abovedescribed" and substitute therefor -- above-described --.

Column 3, lines 58-59, following the word "or", delete the word "restaurant" and substitute therefor -- restauranteur --.

Column 4, line 14, following the word "A", delete the first occurrence of the word "product." and insert -- potato --.

Signed and Sealed this

Fifteenth Day of September, 1987

Attest:

DONALD J. QUIGG

Attesting Officer

Commissioner of Patents and Trademarks